(12) United States Patent
Chen

(10) Patent No.: US 11,616,387 B2
(45) Date of Patent: Mar. 28, 2023

(54) SYSTEM AND METHOD OF CONTROLLING BACKUP POWER OF LITHIUM IRON PHOSPHATE BATTERY FOR VEHICLE

(71) Applicant: Fu-Chieh Chen, Taichung (TW)

(72) Inventor: Fu-Chieh Chen, Taichung (TW)

( * ) Notice: Subject to any disclaimer, the term of this patent is extended or adjusted under 35 U.S.C. 154(b) by 0 days.

(21) Appl. No.: 17/467,454

(22) Filed: Sep. 7, 2021

(65) Prior Publication Data
US 2022/0094196 A1   Mar. 24, 2022

(51) Int. Cl.
*H02J 9/06* (2006.01)
*B60R 16/033* (2006.01)

(52) U.S. Cl.
CPC ............ *H02J 9/061* (2013.01); *B60R 16/033* (2013.01)

(58) Field of Classification Search
CPC .............................. H02J 9/061; B60R 16/033
USPC ................................................. 307/9.1, 10.6
See application file for complete search history.

(56) References Cited

U.S. PATENT DOCUMENTS

| | | | |
|---|---|---|---|
| 7,806,095 B2 * | 10/2010 | Cook | F02N 11/0866 290/38 R |
| 2018/0022300 A1 * | 1/2018 | Labbe | F02N 11/087 307/10.1 |
| 2020/0169114 A1 * | 5/2020 | Almeida | B60R 16/04 |

* cited by examiner

*Primary Examiner* — Michael R. Fin

(57) ABSTRACT

A system of controlling backup power of a lithium iron phosphate battery for a vehicle contains: the lithium iron phosphate ($LiFePO_4$) battery module, a boost module, and a supercapacitor module which are parallelly connected with an electric control device of the vehicle. A first switch electrically is connected with a negative electrode of the electric control device and a negative electrode of the supercapacitor module of the vehicle, a second switch is electrically connected with a negative input electrode and a negative output electrode of the boost module, and a third switch is electrically connected with a positive electrode of the $LiFePO_4$ battery module and a positive input electrode of the boost module. The system further contains a backup control module including a microprocessor configured to direct, control, order, and manage a detection unit, a controlling unit, and a Bluetooth module.

1 Claim, 4 Drawing Sheets

SYSTEM AND METHOD OF CONTROLLING BACKUP POWER OF LITHIUM IRON PHOSPHATE BATTERY FOR VEHICLE

FIELD OF THE INVENTION

The present invention relates to a system and a method of controlling backup power of a lithium iron phosphate battery for a vehicle.

BACKGROUND OF THE INVENTION

If the voltage of the main secondary battery of a vehicle is insufficient, the motor and other electric control device (such as an electric control door and a computer) will not work. For example, when the electronic control door cannot be opened by in a remote control manner and an electronic control manner, the car owner will not be able to enter the car to perform electric rescue.

The present invention has arisen to mitigate and/or obviate the afore-described disadvantages.

SUMMARY OF THE INVENTION

The primary objective of the present invention is to provide a system and a method of controlling backup power of a lithium iron phosphate battery for a vehicle which are capable of overcoming the shortcomings of the conventional system and method of controlling backup power of the lithium iron phosphate battery for the vehicle.

To obtain above-mentioned objective, a system and a method of controlling backup power of a lithium iron phosphate battery for a vehicle provided by the present invention contains: a lithium iron phosphate (LiFePO$_4$) battery module, a boost module, and a supercapacitor module which are connected in parallel. The LiFePO$_4$ battery, the boost module and the supercapacitor module are parallelly connected with an electric control device of the vehicle.

A first switch is electrically connected with a negative electrode of the electric control device and a negative electrode of the supercapacitor module of the vehicle, a second switch is electrically connected with a negative input electrode and a negative output electrode of the boost module, and a third switch is electrically connected with a positive electrode of the LiFePO$_4$ battery module and a positive input electrode of the boost module.

A backup control module includes a microprocessor configured to direct, control, order, and manage a detection unit, a controlling unit, and a Bluetooth module. The detection unit detects a voltage of the LiFePO$_4$ battery module and a voltage of the supercapacitor module, and the controlling unit controls the first switch, the second switch and the third switch. The microprocessor is connected and communicates with a power rescue application (App) via the Bluetooth module, and the power rescue App is built in a smart mobile device.

When the LiFePO$_4$ battery is in the overly low voltage, the vehicle is not started and the electric control device does not operate. When an electronic control door is not opened, the computer is not started to process a power rescue. After starting the system by using the power rescue App of the smart mobile device, the first switch and the second switch are turned off by the system, and the system turns on the third switch so that the LiFePO$_4$ battery increases the voltage of the supercapacitor module to 15 V via the boost module. After the voltage of the supercapacitor module reaches the set value, the system turns off the second switch and the third switch and turns on the first switch solely, such that the system supplies sufficient voltage and electric currents to the electric control device of the vehicle, and the electronic control door and the computer are started. In the meantime, the LiFePO$_4$ battery does not supply the power to the electric control device, thus avoiding over discharge and damage of the LiFePO$_4$ battery.

Thereby, the system and the method of the present invention are capable starting the electric control device of the vehicle easily by using a power rescue application (App) of the smart mobile device.

DETAILED DESCRIPTION OF THE PREFERRED EMBODIMENTS

Figure 1:
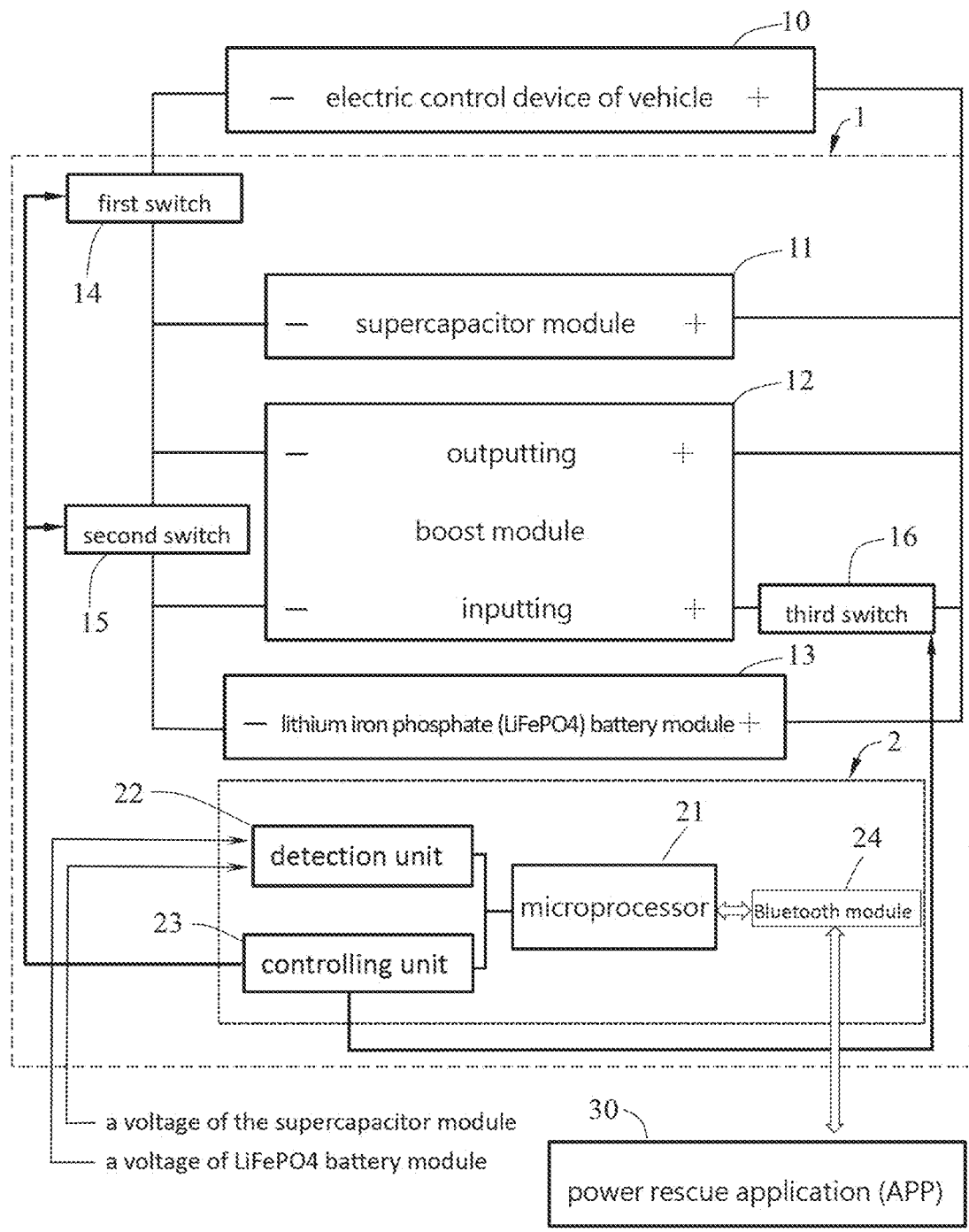
FIG. 1 is a block diagram of a system of controlling backup power of a lithium iron phosphate battery for a vehicle according to a preferred embodiment of the present invention.
Figure 2:
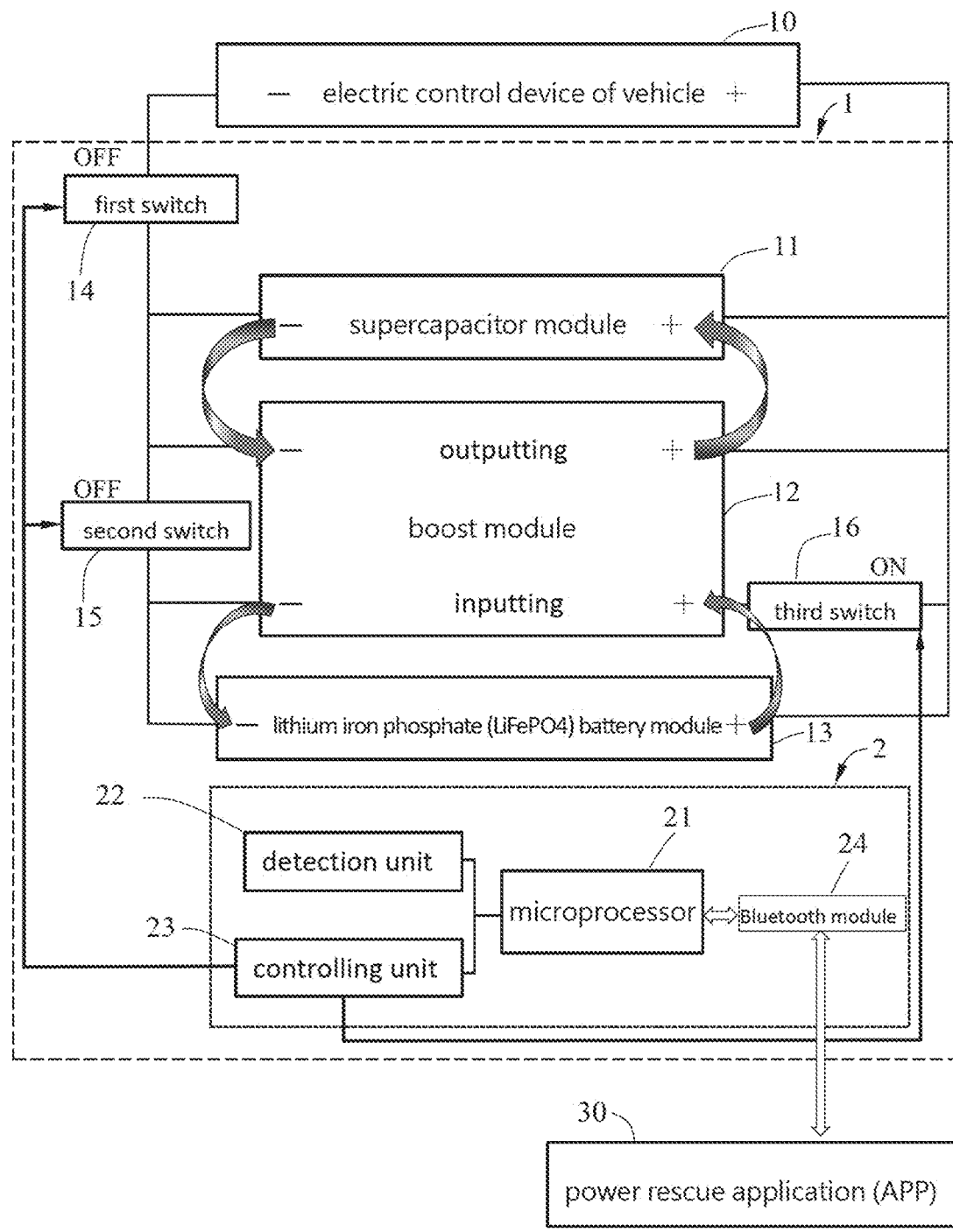
FIG. 2 is a block diagram showing the operation of the system according to the preferred embodiment of the present invention.
Figure 3:
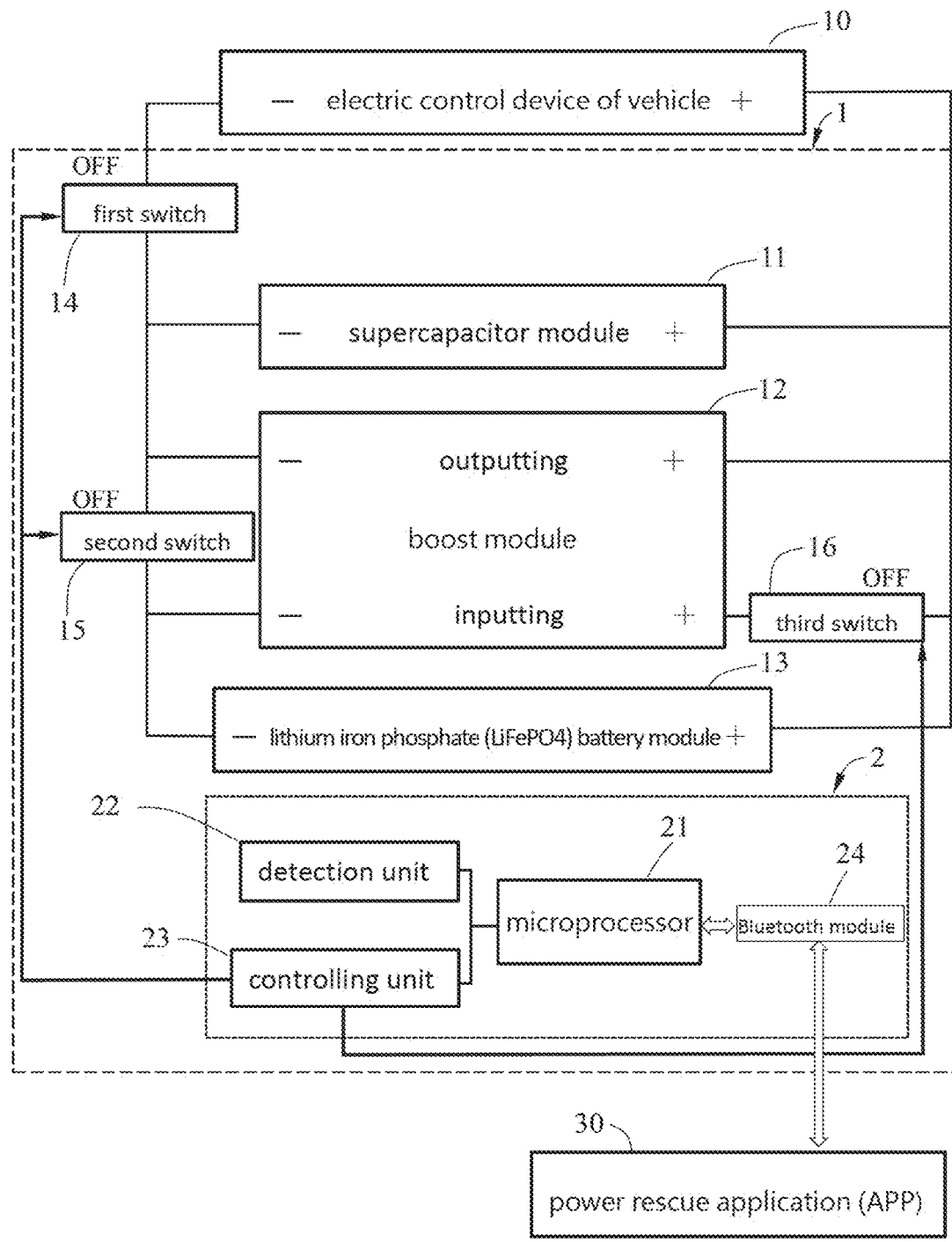
FIG. 3 is another block diagram showing the operation of the system according to the preferred embodiment of the present invention.
Figure 4:
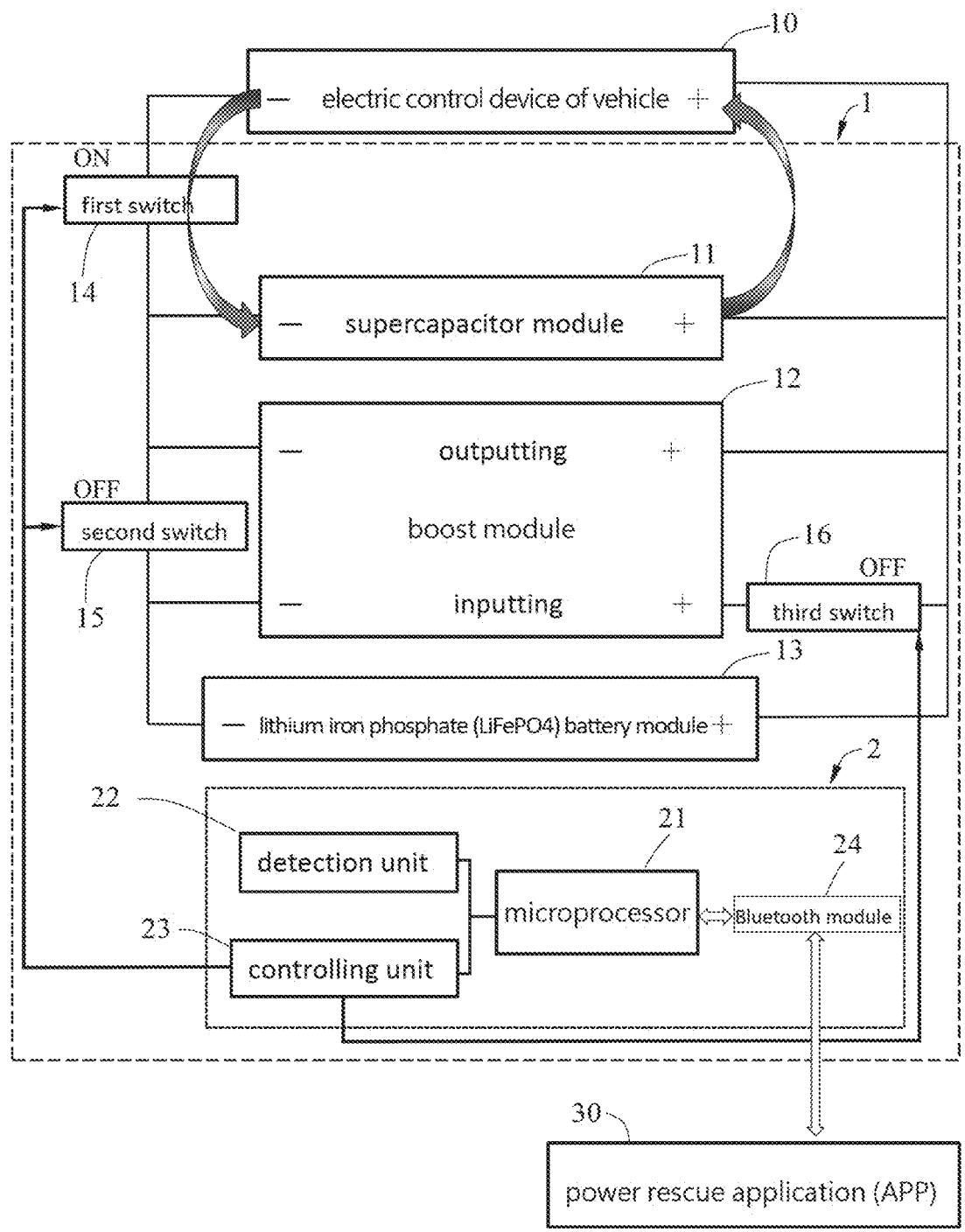
FIG. 4 is also another block diagram showing the operation of the system according to the preferred embodiment of the present invention.

With reference to FIG. 1, a system 1 of controlling backup power of a lithium iron phosphate battery for a vehicle according to a preferred embodiment of the present invention comprises: a lithium iron phosphate (LiFePO$_4$) battery module 13, a boost module 12, and a supercapacitor module 11 which are connected in parallel; wherein the LiFePO$_4$ battery module 13, the boost module 12 and the supercapacitor module 11 are parallelly connected with an electric control device 10 of the vehicle. A first switch 14 is electrically connected with a negative electrode of the electric control device 10 and a negative electrode of the supercapacitor module 11, a second switch 15 is electrically connected with a negative input electrode and a negative output electrode of the boost module 12, and a third switch 16 is electrically connected with a positive electrode of the LiFePO$_4$ battery module 13 and a positive input electrode of the boost module 12. It is noted that the first switch 14, the second switch 15 and the third switch 16 include but are not limited to a metal-oxide-semiconductor field-effect transistor (MOSFET, abbreviated as MOS) and a relay.

The system 1 further comprises a backup control module 2, and the backup control module 2 includes a microprocessor 21 configured to direct, control, order, and manage a detection unit 22, a controlling unit 23, and a Bluetooth module 24. The detection unit 22 detects a voltage of the LiFePO$_4$ battery module 13 and a voltage of the supercapacitor module 11, and the controlling unit 23 controls the first switch 14, the second switch 15 and the third switch 16. The microprocessor 21 is connected and communicates with a power rescue application (App) 30 via the Bluetooth module 24, and the power rescue App 30 is built in a smart mobile device (not shown). The system 1 is configured to execute the method of controlling the backup power of the LiFePO$_4$ battery so as to solve an overly low voltage of the LiFePO$_4$ battery and a failed start of the electric control device 10.

The electric control device 10 of the vehicle includes but is not limited to an electronic control door or a computer.

Referring to FIGS. 1-4, the method of controlling the backup power of the lithium iron phosphate battery comprises steps of:

S1) receiving a control command from the power rescue App 30 by using the microprocessor 21, wherein the control command is sent by the power rescue App 30 via the smart mobile device when the electric control device 10 is not started;

S2) turning off the first switch 14 and the second switch 15 and turning on the third switch 16 by way of the controlling unit 23, wherein the $LiFePO_4$ battery module 13 increases the voltage of the supercapacitor module 11 via the boost module 12, and the detection unit 22 detects the voltage of the supercapacitor module 11;

S3) turning off the third switch 16 by ways of the controlling unit 23 and stopping a power charging of the supercapacitor module 11, when the voltage of the supercapacitor module 11 reaches to a set value (such as 15 V);

S4) turning on the first switch 14 by using the controlling unit 23, maintaining turning-off of the second switch 15 and the third switch 16, and supplying power to the electric control device 10 of the vehicle by using the supercapacitor module 11 so as to start the electric control device 10.

Conventionally, the supercapacitor module 11 is configured to assist in starting, stabilizing, the power charging and power discharging of the vehicle, so further remarks are omitted. However, when the $LiFePO_4$ battery module 13 is in the overly low voltage, for example, the $LiFePO_4$ battery module 13 is less than 10 V, the vehicle is not started and the electric control device 10 does not operate. When an electronic control door is not opened, the computer is not started to process a power rescue. After starting the system 1 by using the power rescue App 30 of the smart mobile device, the first switch 14 and the second switch 15 are turned off by the system 1, and the system 1 turns on the third switch 16 so that the $LiFePO_4$ battery module 13 increases the voltage of the supercapacitor module 11 to 15 V via the boost module 12. After the voltage of the supercapacitor module 11 reaches the set value, the system 1 turns off the second switch 15 and the third switch 16 and turns on the first switch 14 solely, such that the system 11 supplies sufficient voltage and electric currents to the electric control device 10 of the vehicle, and the electronic control door and the computer are started. In the meantime, the $LiFePO_4$ battery module 13 does not supply the power to the electric control device 10, thus avoiding over discharge and damage of the $LiFePO_4$ battery module 13.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A system of controlling backup power of a lithium iron phosphate battery for a vehicle comprising:

a lithium iron phosphate ($LiFePO_4$) battery module, a boost module, and a supercapacitor module which are connected in parallel; wherein the $LiFePO_4$ battery, the boost module and the supercapacitor module are parallelly connected with an electric control device of the vehicle;

a first switch electrically connected with a negative electrode of the electric control device and a negative electrode of the supercapacitor module of the vehicle, a second switch electrically connected with a negative input electrode and a negative output electrode of the boost module, and a third switch electrically connected with a positive electrode of the $LiFePO_4$ battery module and a positive input electrode of the boost module;

a backup control module including a microprocessor configured to direct, control, order, and manage a detection unit, a controlling unit, and a Bluetooth module; wherein the detection unit detects a voltage of the $LiFePO_4$ battery module and a voltage of the supercapacitor module, and the controlling unit controls the first switch, the second switch and the third switch; wherein the microprocessor is connected and communicates with a power rescue application (App) via the Bluetooth module, and the power rescue App is built in a smart mobile device.

\* \* \* \* \*